United States Patent
McDonald

(10) Patent No.: US 9,408,412 B2
(45) Date of Patent: Aug. 9, 2016

(54) APPARATUS AND METHOD FOR CLEANING PRODUCE

(71) Applicant: Tim McDonald, Missouri City, TX (US)

(72) Inventor: Tim McDonald, Missouri City, TX (US)

(*) Notice: Subject to any disclaimer, the term of this patent is extended or adjusted under 35 U.S.C. 154(b) by 3 days.

(21) Appl. No.: 14/812,545

(22) Filed: Jul. 29, 2015

(65) Prior Publication Data

US 2016/0143345 A1     May 26, 2016

Related U.S. Application Data

(63) Continuation-in-part of application No. 14/550,195, filed on Nov. 21, 2014, now Pat. No. 9,320,286.

(51) Int. Cl.
| | |
|---|---|
| A22C 17/00 | (2006.01) |
| A23N 12/02 | (2006.01) |
| B08B 3/14 | (2006.01) |
| A22C 17/08 | (2006.01) |
| A22C 21/00 | (2006.01) |
| A22C 25/02 | (2006.01) |

(52) U.S. Cl.
CPC .............. *A23N 12/023* (2013.01); *A22C 17/08* (2013.01); *A22C 21/0061* (2013.01); *A22C 25/02* (2013.01); *B08B 3/14* (2013.01)

(58) Field of Classification Search
CPC .................................. A22C 9/00; A22C 17/08
USPC .......... 452/106, 123, 119, 173; 119/200, 209, 119/211, 215, 217, 224, 232, 236, 245, 249, 119/252–254, 264, 269
See application file for complete search history.

(56) References Cited

U.S. PATENT DOCUMENTS

| | | | | |
|---|---|---|---|---|
| 1,956,524 A | * | 4/1934 | Byram | A01K 63/003 119/245 |
| 1,964,430 A | | 6/1934 | Eberts | |
| 2,286,393 A | | 6/1942 | Thomas | |
| 2,308,775 A | | 1/1943 | Olson | |
| 2,504,946 A | | 4/1950 | Doolittle | |
| 2,578,808 A | | 12/1951 | Johnson et al. | |
| 3,189,927 A | | 6/1965 | Dyar | |
| 3,452,966 A | * | 7/1969 | Ludwik | B01F 3/04517 119/200 |
| 3,916,777 A | * | 11/1975 | Earl | A22C 9/001 452/141 |
| 4,201,153 A | * | 5/1980 | Nace | A01K 63/00 119/200 |
| 4,621,573 A | | 11/1986 | Lange | |
| 5,562,535 A | * | 10/1996 | Puppolo | A61K 35/32 452/135 |
| 5,791,290 A | * | 8/1998 | Mueller | A01K 61/008 119/218 |

(Continued)

*Primary Examiner* — Richard Price, Jr.
(74) *Attorney, Agent, or Firm* — Egbert Law Offices, PLLC

(57) ABSTRACT

An apparatus for cleaning produce has a container with an interior volume defined by a wall and a pipe positioned in the container adjacent the wall. The pipe has at least one aperture suitable for directing a flow of water toward a portion of the wall spaced from the pipe such that the flow of water creates a cyclonic path in the container. The pipe extends generally vertically along the wall of the container. The pipe includes a plurality of apertures formed in spaced relation to each other along the length of the pipe. The pipe has a closed end positioned below an upper edge of the container. The method includes overflowing the container such that the debris on the produce is removed from the produce.

19 Claims, 4 Drawing Sheets

(56) References Cited

U.S. PATENT DOCUMENTS

| | | | | |
|---|---|---|---|---|
| 5,938,519 A * | 8/1999 | Wright | ............... | A22C 21/04 452/173 |
| 6,443,100 B1 * | 9/2002 | Brenton | ............ | A01K 61/007 119/211 |
| 6,582,612 B1 * | 6/2003 | White | ............... | A01K 63/04 119/208 |
| 7,287,488 B2 * | 10/2007 | Taylor | ............... | A01K 61/007 119/200 |
| 7,363,878 B2 * | 4/2008 | McRobert | ............ | A01K 61/003 119/245 |
| 8,062,105 B2 * | 11/2011 | Aandewiel | ............ | A22B 5/12 452/74 |
| 2011/0220158 A1 | 9/2011 | Ho | | |
| 2013/0093107 A1 | 4/2013 | Funderburg | | |
| 2014/0127986 A1 | 5/2014 | Cady | | |

\* cited by examiner

APPARATUS AND METHOD FOR CLEANING PRODUCE

CROSS-REFERENCE TO RELATED APPLICATIONS

The present application is a continuation-in-part of U.S. patent application Ser. No. 14/550,195, filed on Nov. 21, 2014, and entitled "Apparatus and Method for Cleaning Game", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus and methods for cleaning produce. More particularly, the present invention relates to apparatus for separating debris from the produce. More particularly, the present invention relates to methods and apparatus whereby dirt, rocks, leaves, fungicides and pesticides can be separated from the produce in a simple and convenient manner.

2. Description of Related Art Including Information Disclosed Under 37 CFR 1.97 and 37 CFR 1.98.

Produce is a generalized term for a group of farm- or garden-produced crops and goods including fruits and vegetables. Nuts, grains, oats and tubers are also considered to be produce. The term "produce" implies that the products are fresh and generally in the same state as when they were harvested.

Whenever produce is removed from the garden or farm, the produce often has debris from the earth attached thereto. For example, when potatoes are harvested, the potatoes will have a substantial amount of dirt thereon. When berries or other fruits are harvested, they often have number of stems and residual leaves attached thereto. In other circumstances, when such produce is a product of farming, the produce can often have certain amounts of pesticides and fungicides thereon. As such, whenever the produce is harvested, it is important to be able to scrub and clean the produce before the produce is consumed by individuals or processed further.

The cleaning of produce is a rather time-consuming, labor-intensive, and difficult process. For mass-produced vegetables and fruits, a wide variety of cleaning machines have been developed. These cleaning machines are very complicated and quite expensive. Typically, the machines will include a variety of scrubbing brushes which tend to scrape the exterior of the produce. This can actually result in damage to the produce. In other circumstances, jets of water can be directed to the produce. However, the jets of water often only contact a portion of the surface of the produce and do not effectively scrub the entire fruit or vegetable. In other circumstances, where large numbers of fruits and vegetables are being cleaned, the grouping of such fruits and vegetables will actually impair the ability to effectively clean certain surfaces of the fruit or vegetable.

For garden-produced produce, individuals will often require the use of scrub brushes or other cleaning implements in order to effectively remove the debris from the exterior of the produce. This will make the cleaning of the produce a difficult and time-consuming process. Eventually, users may grow uninterested in the complete cleaning of such produce and, as a result, will be content to leave some of the debris on the produce. Whenever debris remains on the produce, this can impair the taste of the fruit or vegetable, or result in toxic effects to the person consuming the produce. As such, it is very important to effectively clean produce in a quick, easy, and non-labor-intensive manner.

In the past, various patents have issued relating to the cleaning of fruits and vegetables. For example, an early patent is that of U.S. Pat. No. 1,964,430, issued on Jun. 26, 1934 to E. C. Eberts. This patent describes a fruit and vegetable cleaning machine that includes a mass of freely-moving sponges. A rotary screening member is rotated to agitate the mixed mass of fruits and vegetables so as to cause such fruit and vegetables to percolate through the mass of sponges. A liquid is provided to contact with the sponges. Another means is provided for separating the product from the sponges.

U.S. Pat. No. 2,286,393, issued on Jun. 16, 1942 to J. Thomas, discloses a vegetable cleaner in which a series of brush rolls are mounted in parallel relation to form a brushing bed over which the vegetables can be advanced transversely of the rolls. The rolls are driven in a common direction corresponding to the direction of advance of the vegetables. A terminal roll is driven in a direction of rotation opposite to the other rolls in order to arrest the advance of the vegetables. The spacing of the terminal roll in the oppositely-rotating adjacent roll is such that the vegetables resting on the terminal roll and the oppositely-rotating roll are discharged outwardly therebetween and in brushing engagement therewith.

U.S. Pat. No. 2,308,775, issued on Jan. 19, 1943 to S. Olson, teaches a vegetable cleaning machine. This vegetable cleaning machine includes a drum that is open at opposite ends thereof. The drum is supported for rotation about an inclined axis. Rotary brushes are mounted inside the drum in substantially contiguous relationship to each other and with their axes extending parallel to the axis of the drum. The brushes are rotated in the same direction by the rotation of the drum about its axis.

U.S. Pat. No. 2,504,946, issued on Apr. 18, 1950 to J. C. Doolittle, shows a vegetable cleaning machine. In particular, this machine is designed for cleaning podded vegetables. The machine includes a plurality of driven conveyor belts arranged one below the other so that a lower belt will receive the vegetables dropped thereupon from the discharge end of an upper belt so as to form repeated cleaning stations. A current of air is directed over and adjacent to the surface of the lower belts and in a direction opposite to the direction of travel of the conveying surfaces in order to blow stalks, leaves, and other trash from the potted vegetables as they dropped from one belt to another and while they are being conveyed on and by the belts.

U.S. Pat. No. 2,578,808, issued on Dec. 18, 1951 to Johnson et al., teaches a potato cleaning and separating device. This device employs a first chamber containing a brine solution of a sufficient specific gravity to cause the heavier pieces of debris to precipitate to the bottom of the debris while the potatoes float on the surface of the brine solution. A second chamber contains only water wherein the potatoes are washed and separated from the remaining debris.

U.S. Pat. No. 3,189,927, issued on Jun. 22, 1965 to R. L. Dyar, shows a vegetable processing machine including an elongated drum and a means for rotating the drum. The drum rotates about an axis such that a mass of material within the drum moves by gravity to a lower wall of the drum. Elongated brushes are positioned within the drum at a location adjacent to the interior wall of the drum. The brush is rotated in a direction such that the bristles of the brush closest to the inner wall of the drum move in an opposite direction to the movement of the wall of the drum. Material within the drum is conveyed toward the brush during rotation of the drum and is progressively contacted by the drum and expelled toward the rear of the moving mass of material.

U.S. Pat. No. 4,621,573, issued on Nov. 11, 1986 to F. Lange, discloses an apparatus for cleaning fruits and vegetables. This apparatus is provided for removing damaged, skin impurities. This cleaning apparatus has a loading opening, and a housing enclosing a revolving conveyor drum which is partially surrounded by a plurality of abrasive elements. The abrasive elements serve to clean the fruits and vegetables within the housing.

U.S. Patent Application Publication No. 2011/0220158, published on Sep. 15, 2011 to C. T. Ho, provides a fruit and vegetable cleaning device that includes a base, a pump and a pressure vessel. The pump is mounted on the base and includes a water feeding pipe connecting a water inlet port and the pressure vessel. The pressure vessel includes a water discharge port and an electromagnetic valve. The pump supplies water to the pressure vessel to allow air to mix with the water inside the pressure vessel so as to fill the water with air bubbles. Residual pesticides remaining on fruits and vegetables will attach to the tiny air bubbles contained in the water when the water is used to clean the fruits and vegetables.

Additionally, certain patents have issued with respect to the cleaning of game. U.S. Patent Application Publication No. 2013/0093107, published on Apr. 18, 2013 to R. Funderburg, discloses a fish and game washer that is designed to wash and clean meat. The meat is put into a bucket and a water source is connected thereto. Air is sucked in in order to mix with the water. This causes the meat the float up from the bottom and the and begin to toss and tumble. This takes the loose scales, feathers, blood and debris over the top of the bucket.

U.S. Patent Application Publication No. 2014/0127986, published on May 8, 2014 to W. Cady, describes a cleaning device that uses water pressure to prepare fish and wild game for consumption. A bucket is described as having a conduit affixed to a wall thereof. The conduit can be connected to a source of water pressure such that the water pressure is directed into the interior of the bucket so as to interact with the game within the interior of the bucket.

It is an object of the present invention to provide a method and apparatus for cleaning produce that efficiently and effectively separates debris from the produce.

It is another object of the present invention to provide an apparatus and method for cleaning produce which serves to pressure wash the produce.

It is still another object of the present invention to provide an apparatus and method for cleaning produce which can effectively remove debris, liquids and dissolvable solids from the produce.

It is another object of the present invention to provide a apparatus and method for cleaning produce that avoids the need to hand wash and scrub the produce.

It is still further object of the present invention provide a method and apparatus for cleaning produce that effectively catches the debris after it has been removed from the produce.

These and other objects and advantages of the present invention will become apparent from a reading of the attached specification and appended claims.

BRIEF SUMMARY OF THE INVENTION

The present invention is an apparatus for cleaning produce that comprises a container having an interior volume defined by wall and a pipe positioned in the container adjacent to the wall. The container has a base and an upper edge. The pipe has at least one aperture suitable for directing a flow of water toward a portion of the wall spaced from the pipe such that the flow of water creates a cyclonic path in the container. As used herein, the term "produce" includes fruit, vegetables, tubers and nuts. The term "debris" can include dirt, rocks, leaves, fungicides, pesticides and mixtures thereof.

The pipe extends generally vertically along the wall of the container. The pipe is closed at an upper end thereof. A connector is fluidically connected to the pipe adjacent the lower end of the pipe. The connector has a portion extending outwardly of the wall of the container. The connector specifically has a water hose connector thereon such that the pipe can be connected to a water hose. Also, the water hose can be releasably connected to the connector. The water hose is suitable for passing water under pressure into the pipe. A fastener, such as a bolt or a screw, is affixed to the container and extends to the pipe so as to fixedly position the pipe adjacent to the wall of the container.

In the present invention, the pipe has a plurality of apertures formed in spaced relation to each other along a length of the pipe. A first set of apertures is directed in one direction toward a portion of the wall of the container adjacent to the pipe. A second set of apertures is directed toward a portion of the wall further from the pipe. Each of the apertures is canted at an angle approximately 30° to horizontal. The plurality of apertures include a slot formed through a wall thickness of the pipe. The slot communicates with an interior of the pipe. The slot has a length that is substantially greater than a length of the aperture. The closed end of the pipe is positioned below an upper edge of the container. The pipe has a lower end positioned in spaced relation above the base. A screen is positioned at the base and extends outwardly of the container. A seat is removably or pivotally positioned above the upper edge of the container.

The present invention is also a method for cleaning produce the comprises the steps of: (1) placing produce with debris into a container such that the produce and debris resides at a bottom of the container; (2) introducing water into the container such that the water flows in a cyclonic path in the container and such that the produce and debris interact with the introduced water; (3) continually flowing water into the container such that the cyclonic path causes the debris to separate from the produce in the container; and (4) overflowing the water over an upper edge of the container such that the debris is carried out of the container over the upper edge.

In the method of the present invention, the container has a pipe extending generally vertically adjacent a wall of the container. The pipe has a plurality of apertures formed through a wall thickness of the pipe. The step of continually flowing includes directing water under pressure to the plurality of apertures and toward the wall of the pipe in a location spaced from the pipe. The step of directing includes forming a fan of the water from each of the plurality of apertures. The plurality of apertures are in spaced relation along a length of the pipe. A first set of the apertures is directed in a direction different than a direction of a second set of apertures. The method of continually flowing includes directing a plurality of jets of water respectively from the plurality of apertures so as to maintain the cyclonic path of the water in the container. The water is directed from the pipe in a direction corresponding to a chord of a circumference of the container. The water can be screened after the water and the debris overflows the upper edge of the container such that the debris is separated from the water.

This foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
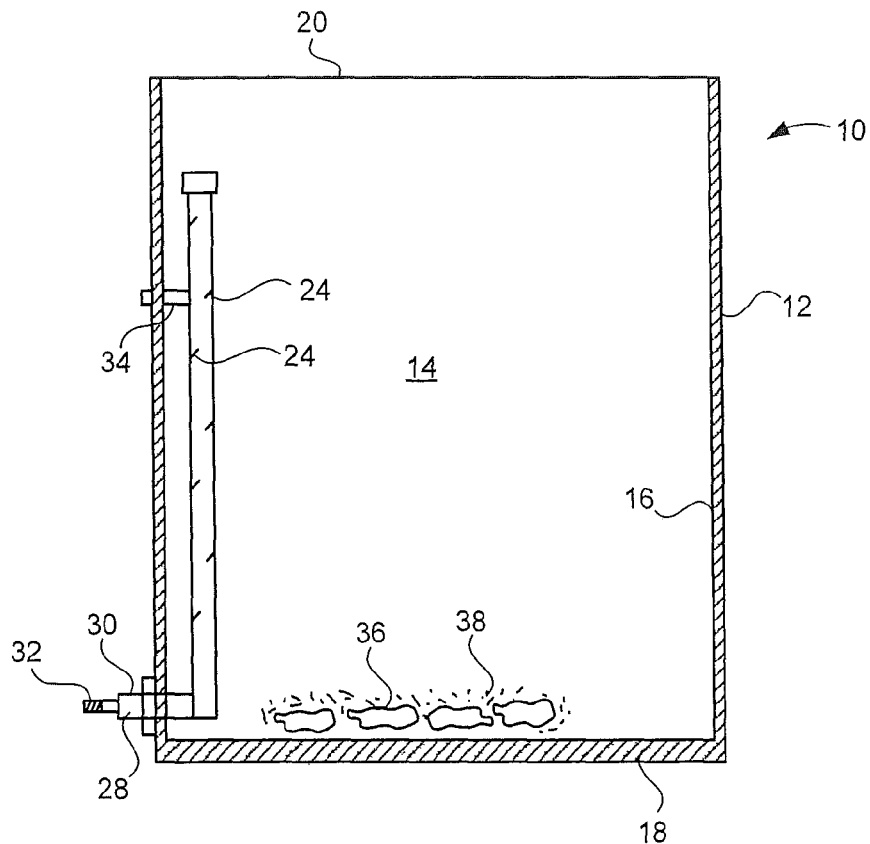
FIG. 1 is a cross-sectional side view showing the apparatus of the present invention.

Referring to FIG. 1, there is shown apparatus 10 for the cleaning of produce. As used herein, the term "produce" can include fruit, vegetables, tubers and nuts. The apparatus 10 includes a container 12 having an interior volume 14. The interior volume 14 is defined by an inner wall 16. The container 12 also includes a base 18 and an upper edge 20. A pipe 22 is positioned in the container 12 adjacent to the inner wall 16. The pipe 22 has at least one aperture 24 suitable for directing a flow of water toward a portion of the wall 16 spaced from the pipe 22 such that the flow of water creates a cyclonic path of the water in the container 12.

In FIG. 1, the pipe 22 extends generally vertically along the inner wall 16 the container. The pipe 24 has a closure 26 at the upper end thereof. As such, all of the water that enters the interior of the pipe 22 will be directed outwardly of the pipe 22 through the apertures 24. A connector 28 is fluidically connected to the pipe 22 adjacent a lower end of the pipe 22. The connector 26 has a portion 30 that extends outwardly of the container 12. The connector 28 also has a water hose connector 32 thereon such that the pipe 22 can be connected to a water hose. Suitable fittings can be associated with the connector 28 so as to establish a liquid-tight seal for the connector through the wall of the container 12. A fastener 34, such as a bolt or a screw, is affixed to the pipe 22 and is affixed to the container 12 so as to fixedly position the pipe 22 adjacent the inner wall 16 of the container 12. Within the concept of the present invention, more than one pipe could be utilized.

As can be seen in FIG. 1, the produce 36 and the debris 38 that is attached to the produce has been introduced through the opening at the upper edge 20 of the container 12. The produce 36 and the debris 38 will initially reside at the base 18 of the container 12. In normal use, for example, potatoes, along with dirt thereon, will be dropped through the opening at the upper edge 20 of the container 12 so as to reside at the base 18. In this manner, the potatoes and the attached dirt and other debris can be accumulated within the container 12. Prior to the present invention, a scrubbing device would have to be used on each of the individual items of produce so as to clean the surface of the produce. It is a very time-consuming and labor intensive process. As such, the present invention was developed so as to allow for the cleaning of the produce 36 and the separation of the debris 38 from the produce 36 in a rapid and efficient manner.

Figure 2:
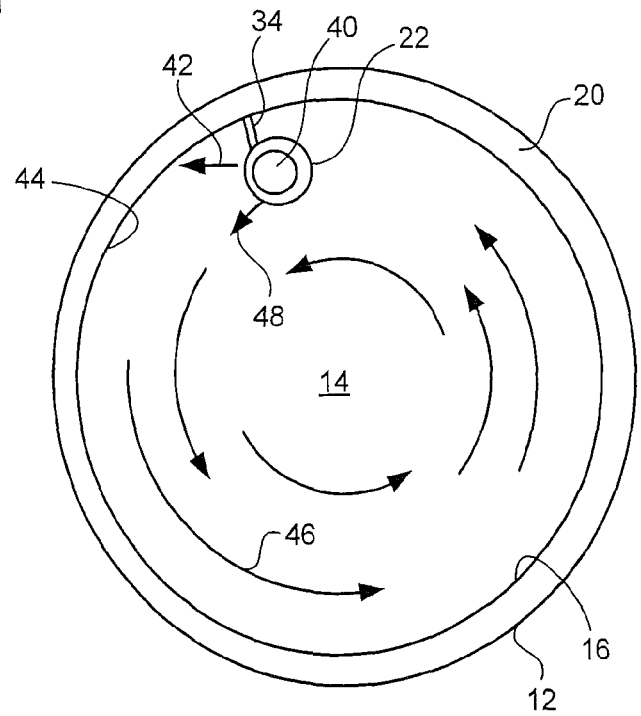
FIG. 2 is a cross-sectional plan view showing the apparatus of the present invention.

FIG. 2 illustrates a plan view of the container 12 and showing the upper edge 20 of the container. The container 12 has an inner wall 16 that defines the interior volume 14 of the container. In FIG. 2, it can be seen that the pipe 22 is affixed by fastener 34 to the inner wall 16 of the container 12.

Importantly, in FIG. 2, it can be seen that the water is directed from the interior 40 of the pipe 20 outwardly through the apertures 24. As such, the water will flow outwardly of the pipe 22 in a first direction through a first set of apertures and will be directed in a second direction from a second set of apertures. The water flow 42 is directed toward a portion 44 of the inner wall 16 of the container in spaced relationship to the pipe 22. The water flow 43 is directed from the second set of apertures outwardly of the pipe 22 also toward another portion of the inner wall 16 of the container 12. In particular, the water flow 42 is directed to the portion of the wall 16 of the container 12 generally adjacent to the pipe 22. The water flow 43 is directed toward a portion of the wall 16 in a location spaced further from the pipe 22 and spaced from the portion of the wall associated with the water flow 42. The direction 42 is generally a chord of a circumference of the container 12. By flowing the water in the first direction, a cyclonic path of water flow (illustrated by arrows 46) is created in the interior 14 of the container 12. The cyclonic path of water flow 42 serves to effectively separate the debris 38 from the produce 36. The first set of apertures 24 of the pipe 22 will distribute the jets of water over a substantial portion of the height of the container 12. This has been found to enhance the strength of the cyclonic flow path into create an improved washing effect. The water flow 43 from the second set of apertures of the pipe 22 provides a broader flow which serves to agitate the water within the container 12 further and to pressure wash the produce within the container. As such, the combined water flows 42 and 43 serve to substantially increase the turbulence within the container for the purpose of separating the debris from the produce. The water flow 42 creates the cyclonic flow path while the water flow 43 agitates the water flows and pressure washes the produce simultaneously. As such, these water flows 42 and 43 combine to enhance the ability of the present invention to effectively clean the produce and remove debris from the produce.

Figure 3:
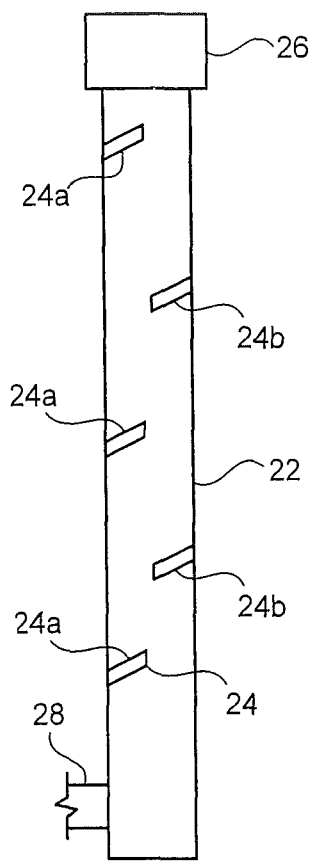
FIG. 3 is an isolated view showing the pipe as used in the apparatus of the present invention.

FIG. 3 illustrates the configuration of the pipe 22. It can be seen that the apertures 24 are formed through the wall thickness of the pipe 22. A closure 26 is located at the top of the pipe 22 so as to effectively close the top of the pipe. The connector 28 is located at the bottom of the pipe 22 so as to allow the introduction of water into the interior 40 of the pipe 22. Importantly, within the concept of the present invention, the connector 22 can be at any location along the length of the pipe 22.

In FIG. 3, it can be seen that each of the apertures 24 is in the nature of a slot. The apertures 24 are positioned in spaced parallel relationship to each other along the length of the pipe 22. A first set of apertures 24a will extend in one direction along a portion of the pipe 22 generally adjacent to the wall 16 of the container 12. A second set of apertures 24b are positioned on the pipe 22 away from the first set of apertures 24a. The second set of apertures 24b are directed further away from the wall of the container 16 than the apertures 24a. In the preferred embodiment of the present invention, there are a total of three apertures 24a. There are two apertures 24b. The apertures 24b are interposed longitudinally between the adjacent pairs of the apertures 24a. As such, this is configured to establish a broad fan-style of spray of water flow from the pipe 22. It can be seen that each of the first set of apertures 24a and the second set of apertures 24b are canted at an approximately 30° angle to horizontal. Once again, this angled relationship of each of the apertures 24a and 24b is configured so as to create the optimal cyclonic water flow path and pressure washing. This slotted type of aperture 24, as opposed the holes, or other types of openings, is intended to create a fan of water as it is ejected under pressure from each of the apertures 24. However, within the concept of the present invention, the apertures 24 can also include holes, openings, and similar techniques for releasing the water under pressure from the pipe 22. Additionally, spray-type fittings could be placed within the holes formed in the pipe 22. It is believed that the fan-shape flow of water greatly facilitates the pressure washing of the produce that enhances the creation of the cyclonic path of the water flow. Additionally, such a fan-type of spray further serves to distribute the pressurized water over a greater area than would be the release of water through the use of a simple circular hole pattern.

Figure 4:
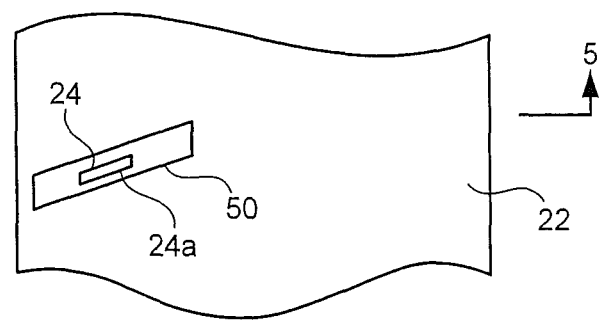
FIG. 4 is a close-up view showing the slot as formed in the pipe of the apparatus of the present invention.

FIG. 4 illustrates the construction of a single aperture 24, and in particular, aperture 24a as located within the slot 50. In experiments with the present invention, it was found that the apertures 24 can be made in a rapid, efficient and effective manner by simply using a saw set to cut the PVC pipe 22. The saw can be set so as to cut the slot 50 to a prescribed depth. Since the pipe 22 has a known wall thickness, the slot 50 is cut through the wall thickness so as to expose the aperture 24. The aperture 24 is exposed so as to have a greater length than a width. As can be seen, the aperture 24 is of an elongated nature. As such, this will cause a fan-type spray pattern. Additionally, the inner walls the slot 50 will also constrain the release of water into such a fan-type pattern and also, through fluid dynamics, enhance the force of the water as it is emitted through the aperture 24.

FIG. 4 further shows that the slot 50 has been cut so as to be canted at approximately a 30° angle with respect to horizontal. Once again, this angling of the aperture 24 and the slot 50 further enhances the wide-area spray-type flow pattern. Aperture 24b will have a similar configuration to aperture 24a.

Figure 5:
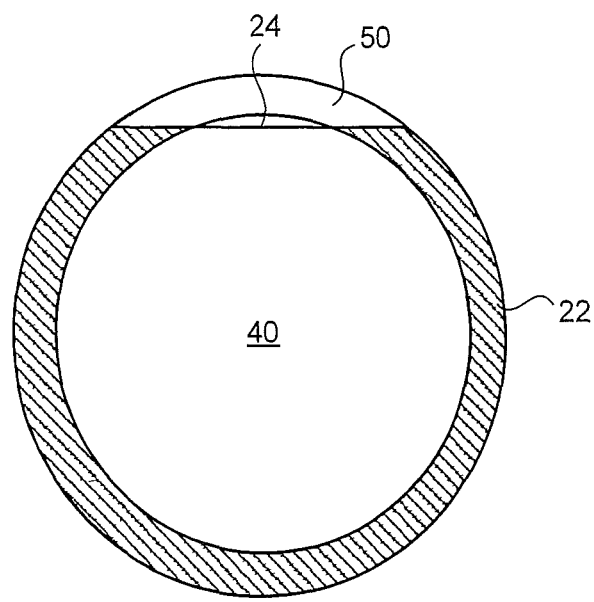
FIG. 5 is a cross-sectional view showing the slot as formed through the wall thickness of the pipe of the apparatus of the present invention.

FIG. 5 illustrates the construction of the slot 50 and the aperture 24 in a view taken across lines 5-5 of FIG. 4. As can be seen, the slot 50 is simply formed by cutting through the pipe 22 with a chop saw. As such, a relatively linear aperture 24 is formed when the depth of the cut enters the interior 40 of the pipe 22. As a result, water can be released through the aperture 24 and restrained and directed by the wall created by the formation of the slot 50.

Figure 6:
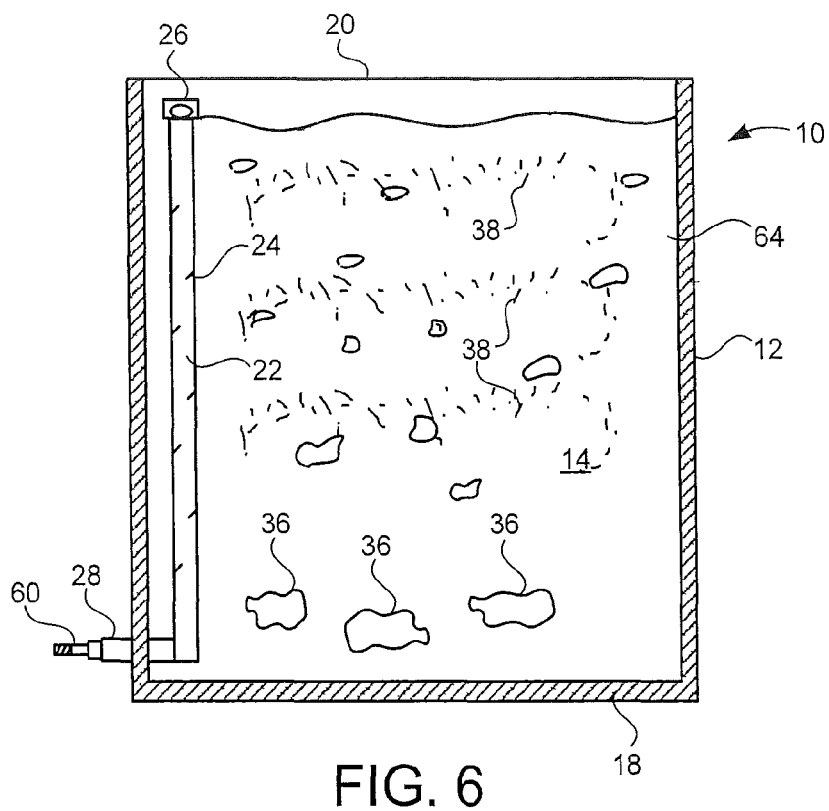
FIG. 6 is a cross-sectional view of the apparatus the present invention showing an intermediate step in the method of the present invention.

FIG. 6 shows an intermediate step in the method of the present invention. In FIG. 6, the apparatus 10 includes the container 12 and the pipe 22 in the manner described herein previously. A garden hose 60 is connected to the connector 28. As such, the water hose 60 can deliver water under pressure through the connector 28 and into the interior of the pipe 22. In FIG. 6, it can be seen that the pipe 22 has a closure 26 at an upper end thereof. Ultimately, the upper end of the pipe 22 should be disposed below the upper edge 20 of the container 12. When the cyclonic water path is created in the manner described herein previously, the extension of the pipe 22 above the upper edge 12 would restrict the dispersion of the debris and the release of the debris. In other words, the cyclonic path of the flow of the debris would encounter the upper end of the pipe 22 and tend to clump and gather in such an area. As such, within the concept of the present invention, the upper end of the pipe 22 should be disposed a certain distance below the upper edge 20 of the container 12.

In FIG. 6, it can be seen that water has been introduced through the apertures 24 of the pipe 22 into the interior 14 of the container 12. The introduction of the water in the cyclonic flow path illustrated in FIG. 2 causes the produce 36 to generally tumble in the area adjacent to the base 18 of container 12. The fan-type flow of water from the pipe 22 will serve to pressure-wash the tumbling produce 36. The debris 38 is in the nature of dirt, rocks, leaves, pesticides, fungicides, and mixtures thereof, will tend to move upwardly toward the upper edge 20 of the container 10. This is because the debris 38 is generally less dense than water and less dense than the meat 36. The cyclonic flow of water within the container 12 also serves to urge the debris 38 upwardly. When the debris 38 is in the nature of liquid or dissolvable solid, the continual flow of water into the interior 14 of the container 12 will continually dilute the liquid or dissolvable solid within the container. The liquid or dissolvable solid will mix with the water and be discharged in the manner shown in FIG. 7.

Figure 7:
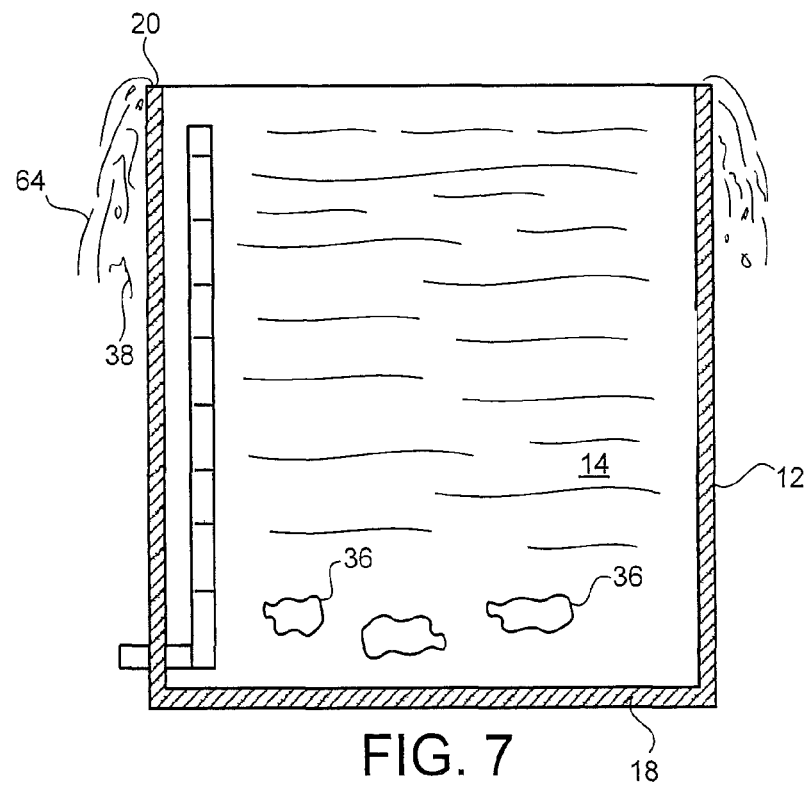
FIG. 7 is a cross-sectional view of the apparatus the present invention showing a later step in the method of the present invention.

In FIG. 7, it can be seen that after a certain amount of time, the produce 36 will reside adjacent to the base 18 of the container 12. The water 64 from the interior 14 of the container 12 overflows the upper edge 20 of the container 12. This overflow will serve to discharge the debris 38 outwardly of the container 12. Ultimately, after a period of time, the liquids or dissolvable solids will continue to dilute until only clear water resides within the interior 14 of the container 12. After the debris 38 has been discharged over the upper edge 20 of the container 12, and after the liquids or dissolvable solids have become sufficiently dilute, the water flow can be turned off and the produce 36 removed from the interior 14 of container 12. The produce will be very clean and suitable for use without further treatment. As such, the system of the present invention avoids the requirement for meticulously washing the produce after it is harvested. It is believed that the process of the present invention can effectively clean the produce 36 in a short period of time.

Figure 8:
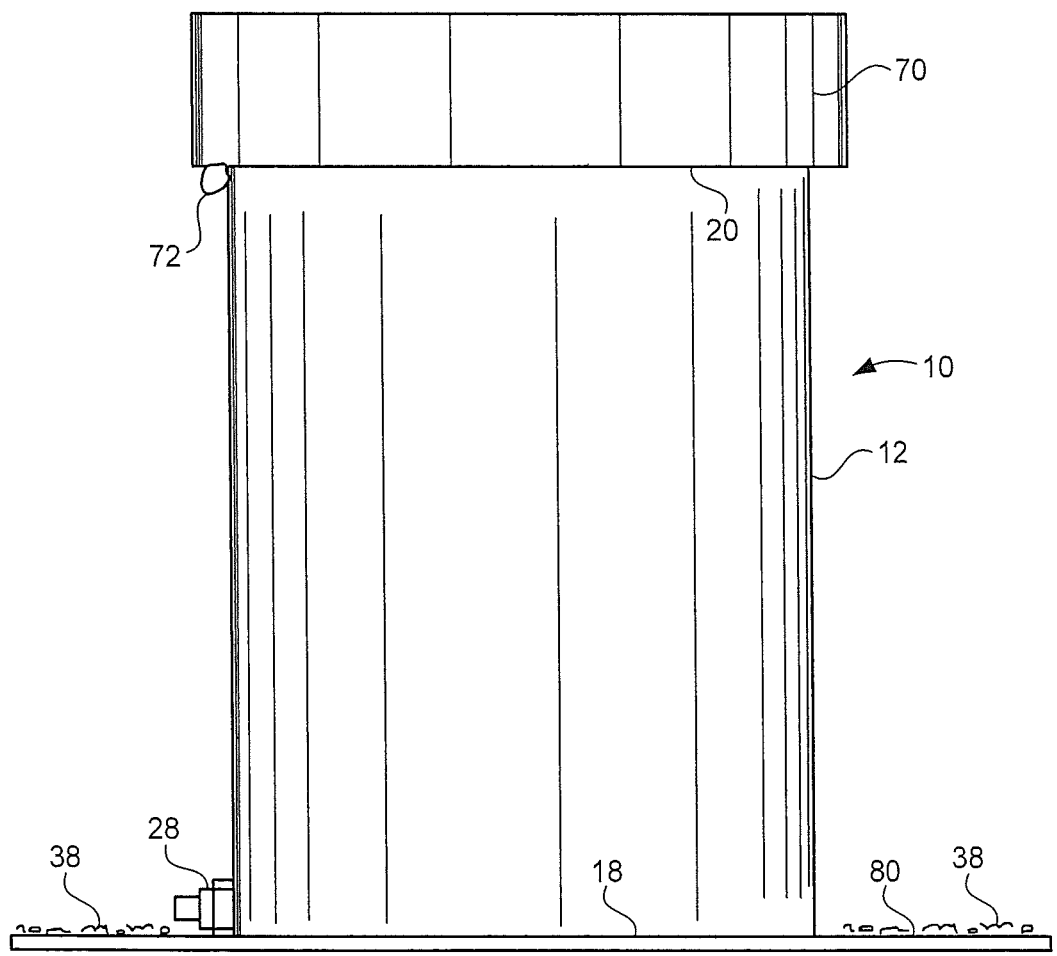
FIG. 8 is a side elevational view of the apparatus of the present invention and showing, in particular, a screen and a seat associated with the container.

FIG. 8 shows the exterior view of the container 12 of the apparatus 10 of the present invention. In FIG. 8, it can be seen that the container 12 has a generally cylindrical construction. The connector 28 is illustrated as located adjacent to the base 18 of the container 12. Importantly, a seat 70 can be placed onto the upper edge 20 of the container 12. The seat 70 can take any number of forms, as already known. In particular, a suitable insert can be applied into the interior of the container 12 such that the seat 12 can be pivotally connected by a hinge 72. As such, this construction allows the seat to be pivoted upwardly so as to allow access to the interior of the container 12. Alternatively, the seat 70 can simply be lifted from the container 12 so that the interior of the container 12 is exposed.

In FIG. 8, it can further be seen that there is a screen 80 that it is located adjacent to the base 18 of the container 12. The screen 80 extends outwardly of the exterior of the container 12. The screen 80 is provided so as to catch the debris 38 after it is washed from the interior 14 of the container 12. In certain circumstances, users do not desire to have debris, liquids and possibly hazardous dissolvable solids in an area adjacent to the apparatus 10. As such, the screen 80 is provided so as to collect the debris 38 thereon. As a result, the water will pass through the screen 80 while the debris 38 is collected on the top surface of the screen 80. Various manual techniques can then be employed so as to simply dispose of the debris 38 after it is collected on the top surface of the screen 80.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for cleaning produce, the apparatus comprising:
    a container having an interior volume defined by a wall, said container having a base and an upper edge; and
    a pipe positioned in said container adjacent said wall, said pipe having a plurality of slots suitable for directing a flow of water toward a portion of said wall spaced from said pipe such that said flow of water creates a cyclonic path in said container so as to separate debris from the produce such that the debris circulates upwardly so as to overflow said upper edge of said container.

2. The apparatus of claim 1, said pipe extending generally vertically along said wall of said container, said pipe being closed at an upper end thereof.

3. The apparatus of claim 2, said a plurality of slots formed in spaced relation to each other along a length of said pipe.

4. The apparatus of claim 3, said plurality of slots comprising:
    a first set of slots formed in said pipe so as to be directed toward a first portion of said wall of said container generally adjacent said pipe; and
    a second set of slots formed in said pipe so as to be directed toward a second portion of said wall of said container, said second portion of said wall of said container being further from said pipe than said first portion of said wall of said container.

5. The apparatus claim 4, the slots of said second set of slots being positioned between adjacent pairs of slots of said first set of slots.

6. The apparatus of claim 3, each of said plurality of slots being canted at approximately 30° with respect to horizontal.

7. The apparatus of claim 2, said closed end of said pipe positioned below said upper edge of said container.

8. The apparatus of claim 1, further comprising:
    a connector fluidically connected to said pipe adjacent a lower end of said pipe, said connector having a portion extending outwardly of said wall of said container.

9. The apparatus of claim 8, said connector having a water hose connector thereon such that said pipe can be connected to a water hose.

10. The apparatus of claim 8, further comprising:
    a water hose releasably connected to said connector, said water hose suitable for passing water under pressure into said pipe.

11. The apparatus of claim 1, further comprising:
    a screen positioned at said base and extending outwardly of said container.

12. The apparatus of claim 1, further comprising:
    a seat removably or pivotally positioned above said upper edge of said container.

13. A method of cleaning produce having debris thereon, the method comprising:
    placing the produce with debris thereon into a container such that the produce with debris thereon resides at a bottom of said container;
    introducing water into said container such that the water flows in a cyclonic path in said container, said produce with the debris thereon interacting with the introduced water;
    continually flowing water into said container such that the cyclonic path causes the debris to separate from the produce in said container; and
    overflowing the water over an upper edge of said container such that the debris is carried out of said container over said upper edge.

14. The method of claim 13, said container having a pipe extending generally vertically adjacent a wall of said container, said pipe having a plurality of apertures formed through a wall of said pipe, said step of continually flowing comprising:
    directing water under pressure through said plurality of apertures toward the wall of said container at a location spaced from said pipe.

15. The method of claim 14, the step of directing comprising:
    forming a fan of water from each of said plurality of apertures.

16. The method of claim 14, the plurality of apertures being in spaced relation along a length of said pipe, the method of continually flowing comprising:
    directing a plurality of jets of water respectively from said plurality of apertures so as to maintain the cyclonic path of the water in the container.

17. The method of claim 14, the step of directing water under pressure comprising:
    directing the water from the pipe in a direction corresponding to a chord of a circumference of said container.

18. The method of claim 13, the debris selected from the group consisting of dirt, leaves, rocks, pesticides, fungicides and mixtures thereof.

19. The method of claim 13, further comprising:
    screening the water after the water and the debris overflows the upper edge of said container such that the debris is separated from the water.

\* \* \* \* \*